US009278401B2

(12) United States Patent  
Biggs et al.

(10) Patent No.: US 9,278,401 B2  
(45) Date of Patent: Mar. 8, 2016

(54) FILL HEAD INTERFACE WITH COMBINATION VACUUM PRESSURE CHAMBER

(71) Applicant: International Business Machines Corporation, Armonk, NY (US)

(72) Inventors: Glen N. Biggs, Wappingers Falls, NY (US); Russell A. Budd, North Salem, NY (US); Benjamin V. Fasano, New Windsor, NY (US); John J. Garant, Poughkeepsie, NY (US); Peter A. Gruber, Mohegan Lake, NY (US); John P. Karidis, Ossining, NY (US); Bouwe W. Leenstra, Walden, NY (US); Phillip W. Palmatier, Hopewell Junction, NY (US); Kevin M. Prettyman, Poughkeepsie, NY (US); Christopher L. Tessler, Campbell Hall, NY (US); Thomas Weiss, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 13/764,254

(22) Filed: Feb. 11, 2013

(65) Prior Publication Data

US 2014/0224860 A1     Aug. 14, 2014

(51) Int. Cl.  
     *B23K 3/06*      (2006.01)

(52) U.S. Cl.  
     CPC .............. *B23K 3/0607* (2013.01); *B23K 3/0638* (2013.01)

(58) Field of Classification Search  
     USPC ........ 228/33, 39, 43, 256; 118/209, 211, 243, 118/256, 413  
     See application file for complete search history.

(56) References Cited

U.S. PATENT DOCUMENTS

| | | | | |
|---|---|---|---|---|
| 4,934,309 | A | * | 6/1990 | Ledermann et al. ............ 118/50 |
| 6,056,191 | A | | 5/2000 | Brouillette et al. |
| 6,231,333 | B1 | * | 5/2001 | Gruber et al. ................. 425/546 |
| 6,783,797 | B2 | * | 8/2004 | Bourrieres et al. .......... 427/97.1 |
| 6,995,020 | B2 | * | 2/2006 | Capodieci et al. ............. 436/94 |
| 7,066,378 | B2 | * | 6/2006 | Pedigo ....................... 228/248.1 |
| 7,296,725 | B2 | * | 11/2007 | Gruber et al. ..................... 228/8 |
| 7,449,067 | B2 | * | 11/2008 | Andry et al. .................. 118/209 |
| 7,980,445 | B2 | * | 7/2011 | Budd et al. ...................... 228/33 |
| 8,181,846 | B2 | * | 5/2012 | Budd et al. .................... 228/256 |
| 2002/0175438 | A1 | | 11/2002 | Gruber et al. |
| 2005/0263571 | A1 | | 12/2005 | Belanger et al. |

\* cited by examiner

*Primary Examiner* — Devang R Patel  
(74) *Attorney, Agent, or Firm* — Scully, Scott, Murphy & Presser, P.C.; Daniel P. Morris, Esq.

(57) ABSTRACT

A fill head apparatus includes at least one chamber for holding a fluid. The chamber has an outlet for expelling the fluid. A vacuum device has an inlet for a suction device adjacent to the fluid outlet. A plurality of flexible and resilient sealing devices contact a top surface of a workpiece. The sealing devices are positioned on opposing sides of the chamber outlet and on opposing sides of the vacuum device inlet, such that the sealing devices create at least a partial seal around a cavity defined by the workpiece and the cavity is beneath both the chamber outlet and the vacuum outlet.

16 Claims, 3 Drawing Sheets

FILL HEAD INTERFACE WITH COMBINATION VACUUM PRESSURE CHAMBER

FIELD OF THE INVENTION

The present invention relates to an apparatus having a fill head interface for vacuum and pressure fill, and more particularly, an apparatus having a fill head interface including adjacent vacuum and pressure devices for use in a manufacturing process.

BACKGROUND OF THE INVENTION

Typical precision patterned fill processes, for example, in semiconductor manufacturing (e.g., integrated circuits, chip technology, and chip packaging), provide filling of features (cavities or trenches created, for example, by etching) on a wafer or semiconductor chip. The features may be filled with substances including pastes, inks, liquid metals (such as solder) and solvents. These materials may be at sub-ambient, ambient, or high temperatures such as molten solders. Further, the features may be such features and cavities required in manufacturing of a product, including small features, for example, 5-200 μm wide and/or deep.

One problem associated with current patterned fill processes is that pressure alone is often not sufficient to inject materials into the features. Moreover, for example, through holes of high aspect ratio, i.e., comparatively large height and diameter, or height and width, can be difficult to fill. Furthermore, blind holes are often very difficult to fill since entrapped gas backpressure can prevent complete filling of the holes.

Typically, there are problems filling holes or mold features using cavity filling processes due to the presence of ambient atmosphere gas in the features. The gas must be completely displaced by the filling material or gas pockets compromise the filled feature and/or can cause a break in a seal around the feature. The problem is accentuated during high speed fills where the feature or cavity has minimal time to bleed out the entrapped gas while the fill material enters the cavity. Thus, the displacement process often is incomplete in the time desired for filling features, and results in partially filled or in extreme cases empty cavities which become defects in the process. For some operations, no defects, such as partial or unfilled cavities of features are allowable. Entrapped gases in the features may result in a partially filled cavity. A partially filled feature or cavity may result in seal degradation around the feature, especially over extended periods of time at high temperatures, e.g., over 200° degrees Celsius.

Another problem with current feature filling processes is that current attempt to seal the feature are inadequate to maintain the seal around the feature, as the surface area may be rough. The roughness may be caused by current sealing methods which may drag the fill substance, such as solder, from the cavities leaving streaks on the surface area of the device, e.g., wafer.

Referring to FIG. 1, a known fill head assembly 10 for dispensing molten solder into a mold plate uses a fill head 20. The fill head assembly 10 further includes a solder reservoir 12 being partially filled with solder 14. A body portion 30 of the assembly 10 includes two heater 32 for heating the solder 14 in the reservoir 12. A passageway 18 provides an inlet for the solder and is pressurized with a downward pressure 19. A solder fill region 16 or solder outlet in the solder fill head 20 provides egress for the solder 14. Two seals 24 are positioned on opposite sides of the solder fill region 16. A mold plate 40 (for example, a glass mold plate) includes cavities 44. Using the assembly 10, the body portion 30 is heated to above the melting point of solder using built-in cartridge heaters 32. For example, tin or tin alloy solders melt at approximately 230 degrees C., therefore in this case the body portion is heated to around 250 degrees C. The molten solder 14 is held in the sealed reservoir 12. The fill head (alternatively FH or solder fill head) assembly 10 rests on the mold plate 40 and a nominal load or downward force is applied (typically 2.5 lbs/linear inch of seal). A seal at the solder in solder outlet 16 prevents the solder 14 from leaking out the bottom of the fill head assembly 10. The solder reservoir 12 is pressurized, usually to a pressure of between 0 and 20 psi, to ensure that solder enters the mold plate 40 cavities 44 during the mold fill process. The small cavities 44 in the mold plate 40 are filled by moving the mold plate 40 underneath the solder fill head 20, typically at a speed of between 0.1 to 10 mm/sec. Air is purged from the mold plate cavities as the solder enters the cavities. The air escapes between the seal 24 and a top surface 42 of the mold plate 40. This process continues until all mold cavities 44 are filled. The mold plate 40 is moved in the direction 41. The mold plate 40 with the filled cavities 45 is then removed and passed to the next tool where the solder is transferred from the mold to the pads of a silicon wafer.

Shortcomings with current methods of solder fill described above include the solder must exert pressure on the air in the cavities to force the air from the cavities. This pressure may cause the solder to leak from the seal in the outlet 16, particularly if there are variations in the seal or variations in the flatness of the mold plate. Another problem is that for air from the cavities to escape across the seal it is helpful if the seal is roughened, textured, or scratched to provide small channels to enable the air to more easily escape between the seal and the top surface of the mold. However, this approach results in increased wear over time, for instance wearing away the channels or scratches, resulting in the same problem as the channels where to prevent, i.e., difficulty in purging the air from the cavities. An additional problem with current approaches is that even with the textured or channeled seal discussed above, pressure alone may not be sufficient to eject air from the cavities, thereby unwanted air remains in the cavities resulting in the undesirable condition of partially filled cavities, i.e., cavities partially filled with solder.

Other known fill head assemblies include a solder dispensing region, a vacuum region, a flat seal, and channels or slots that enable communication between the vacuum region and the solder region. The vacuum region is intended to remove the air from the mold plate cavities prior to fill. However, several deficiencies of known designs include difficulty in maintaining desired contact between the solder fill head assembly and the mold plate by using a flat seal. For example, even if a compliant seal material is used, irregularities in the mold plat e surface and alignment errors between the fill head assembly and the mold plate result in solder leaking across the seal. It is also difficult to maintain a vacuum in the mold plate cavities prior to solder fill due to air leaking into the vacuum region. Another problem with current designs is that as the seal wears, small slots between the vacuum region and the solder region tend to disappear, thus making it difficult to maintain a good vacuum in the mold plate cavities prior to solder fill. Another problem with current designs is that a flat seal does not provide adequate wiping as it moves across the mold plate, and therefore tends to leave streaks of solder on the mold surface.

It would therefore be desirable to provide a localized vacuum environment to remove ambient gas and encourage backfilling of a material used to fill features during manufacturing. It would also be desirable to provide an apparatus and method for filling features with material at high speed, without material overfill, bridging, or streaking. Further, there is a need for a reliable mold filling process which ensures that each cavity or feature is accurately filled by a fill head device.

SUMMARY OF THE INVENTION

In an aspect of the invention a fill head apparatus includes at least one chamber for holding a fluid. The chamber has an outlet for expelling the fluid. At least one vacuum device has an inlet adjacent to the fluid outlet. A plurality of flexible and resilient sealing devices contact a top surface of a workpiece. The sealing devices are positioned on opposing sides of the chamber outlet and on opposing sides of the vacuum device inlet. The sealing devices create at least a partial seal around a cavity defined in the workpiece and beneath both the chamber outlet and the vacuum inlet.

BRIEF DESCRIPTION OF THE DRAWING

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
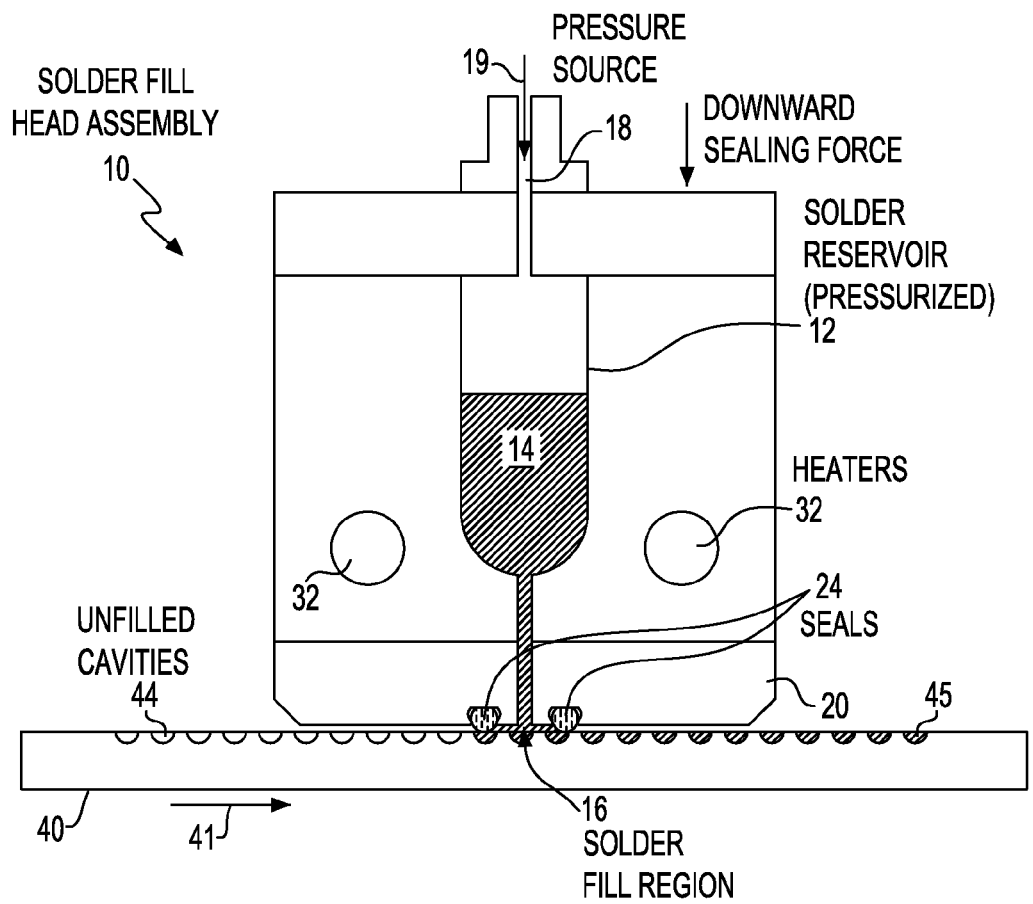
FIG. 1 is a cross-sectional front elevational view of a prior art solder fill head assembly, the solder fill head assembly includes a solder reservoir, a solder dispensing region, seals, and a work piece or plate with cavities being filled with molten solder.
Figure 2:
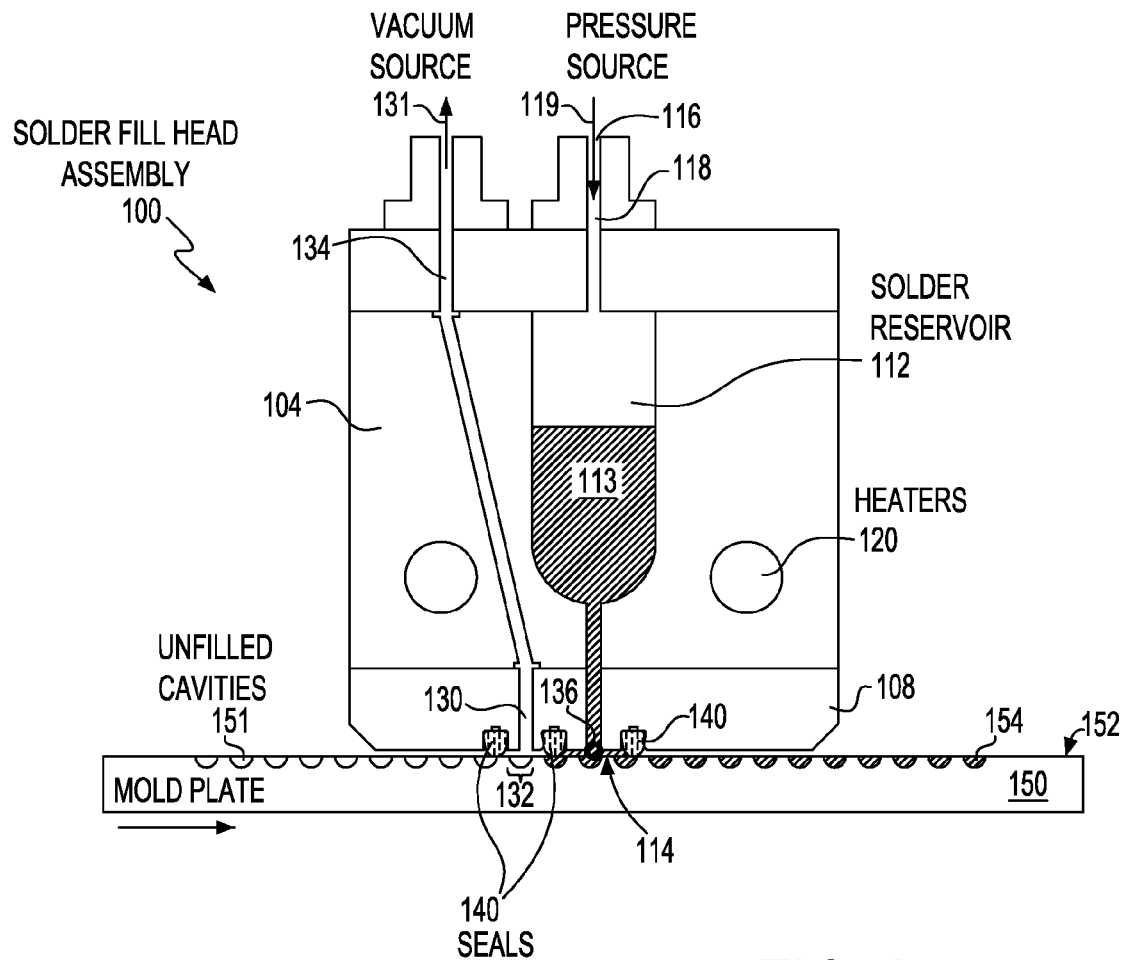
FIG. 2 is a cross-sectional view of a fill head apparatus according to an embodiment of the present invention including a solder fill head assembly, the solder fill head assembly includes a solder reservoir, a solder dispensing region, a vacuum region, a vacuum and seals, a mold plate is depicted being filled with molten solder.
Figure 3:
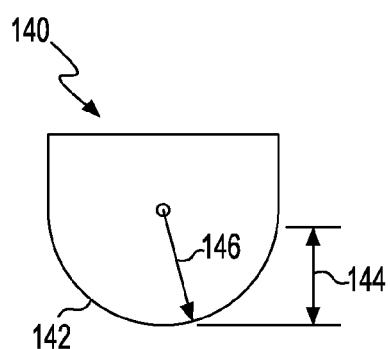
FIG. 3 is a detail side elevational view of the seal shown in FIG. 2.

Referring to FIG. 2, an embodiment of a fill head apparatus 100 according to the present invention includes a body portion 104 and a fill head 108 attached to the body portion 104. The body portion 104 includes a sealed solder reservoir 112, internal heaters 116, a solder fill region 114 or outlet including a solder head 136 for egress of the solder 113 from the solder reservoir 112. The solder reservoir contains solder 113 filled through an inlet 116 in a passageway 118. The passageway in under pressure from a pressure source 119, to maintain positive pressure on the solder 113 in the solder reservoir 112. The fill head 108 includes a vacuum region or vacuum inlet 130. The vacuum region 130 communicates with a vacuum source 131 through a vacuum tube 134. The fill head 108 further includes a plurality of seals 140. The seals 140 are positioned on each side of the vacuum inlet 130 and on each side of the fill region 114, as shown in FIG. 2. The seals 140 include an arcuate seal head 142, as show in more detail in FIG. 3. The arcuate seal head 142 has a specified radius 146 and dimension 144. The arcuate seal head 142 of the seal 140 provide superior sealing between the top surface 152 of a mold plate 150. The mold plate 150 includes cavities or features 154.

The fill head apparatus 100 operates according to a method of the present invention by initially heating the fill head body portion 104 above the melting point of the solder 113 using the built-in cartridge heaters 120. Solders may include Tin or Tin alloy solders, which melt at approximately 230 degrees C., therefore, for the case where Tin or Tin alloy solders are used, the solder fill head is heated to around 250 C. The molten solder is held in a sealed reservoir. The solder fill head (or FH) 136 rests on mold plate 150 and a nominal load or down force is applied (typically 2.5 lbs/linear inch of seal) to ensure satisfactory contact between the fill head 136 and the mold plate 150 top surface 152. The seals 140 surround the solder fill region 114 preventing the solder 113 from leaking out the bottom of the fill head 136. The seals 140 surrounding the vacuum region ensure that a quality specified vacuum is maintained. The middle seal 140, i.e., the seal 140 between the solder fill region 114 and the solder outlet 130 performs two functions, encouraging confinement of the solder and maintaining a vacuum region 132. The seal 140 material is highly compliant, typically with a height of about 3 mm or more, thus ensuring adequate contact is maintained between the fill head 136 and the mold top surface 152, even though the mold top surface 152 may not be flat or an imperfect alignment is realized between the fill head 136 and the mold plate top surface 152.

The mold plate cavities 154 are filled by moving the mold underneath the solder fill head 136, for example, at a speed of between 0.1 to 10 mm/sec. Air is removed from the cavities 151 as the cavities enter the fill head's vacuum region. The cavities 151 proceed directly to the solder fill region, transitioning across the common middle seal section. No slots or scratches on the middle seal are required since a short distance is traversed and the seal is highly compliant. The cavities are filled with solder in the solder fill region. A small pressure may be applied to the solder reservoir (0 psi to 10 psi) to ensure complete cavity fill. The fill process continues until all mold cavities are filled. The mold plate is then removed and passed to the next tool where the solder is transferred from the mold to the pads of a silicon wafer.

Figure 4:
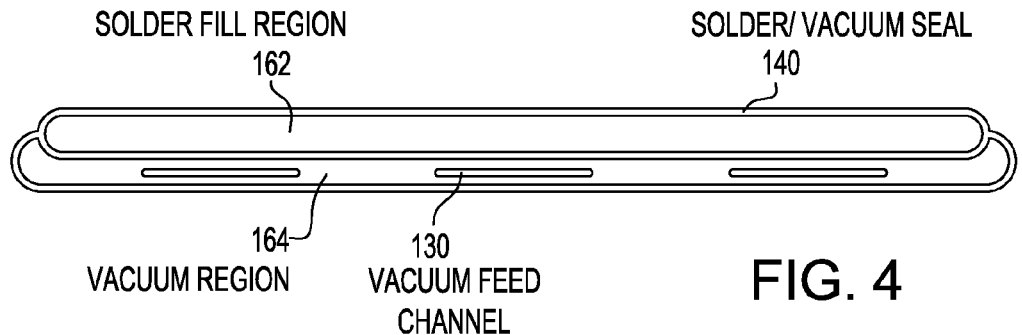
FIG. 4 is a bottom view of a solder fill head assembly, including a solder dispensing region, a vacuum region, and a solder and vacuum seal.

FIG. 4 shows a bottom view of the fill head assembly 10. A unified seal consists of a solder fill region 162 and a vacuum region 164. As shown in FIG. 4, the solder fill region 162 may be elongated with rounded ends. The solder fill region is of sufficient length to cover the cavities (or cavity region) on the mold plate. For example, for 300 mm wafers, the solder fill region may need to be approximately 300 mm in length for all solder balls (mold plate cavities) to be filled. The vacuum region 164 is defined by an additional seal section which extends from the ends of the solder fill seal region 162, around to the leading edge of the fill head. Vacuum feed channels 130 (e.g., slots, holes, etc.) are connector to a vacuum source.

Further, referring to FIG. 4, a cavity 154 of the mold plate 150 includes a vacuum inlet 130 passing over the cavity 154. A seal 140 is also passing over the cavity 154 providing a seal between the top surface 152 of the mold plate 150 and the seal 140. The seal also wipes clear the top surface 152 of solder.

Figure 5:
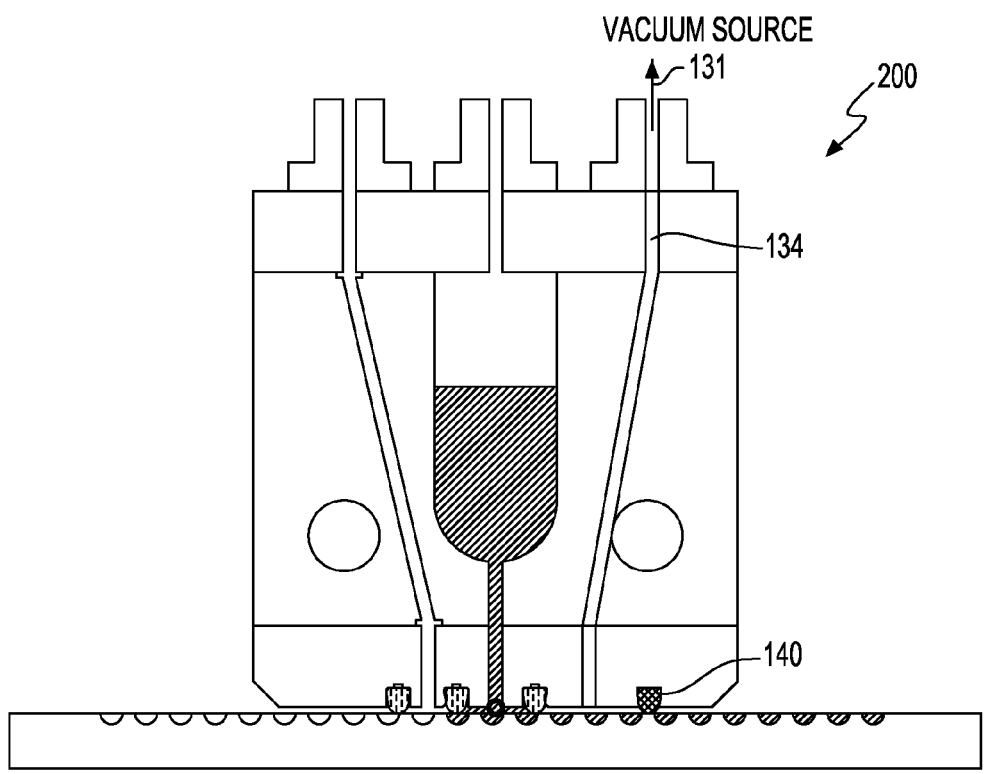
FIG. 5 is a cross-sectional view of a bi-directional fill head apparatus according to another embodiment of the present invention similar to the embodiment shown in FIG. 2 and further including a second vacuum region and vacuum, and the apparatus being capable of filling the mold plate bi-directionally.

Referring to FIG. 5, another embodiment of the present disclosure invention includes a bi-directional fill head apparatus 200. The fill head apparatus 200 includes like elements of the fill head apparatus 100 shown in FIG. 2, wherein the same reference numerals are used. Additionally, the bi-directional fill head apparatus 200 includes a second vacuum source 131 and another seal 140 such that opposing seals 140 are on opposite sides of the second vacuum source inlet 130. The apparatus 200 is capable of filling the cavities with solder in either direction while maintaining the seal about the cavity and initially vacuuming the cavity.

Figure 6:
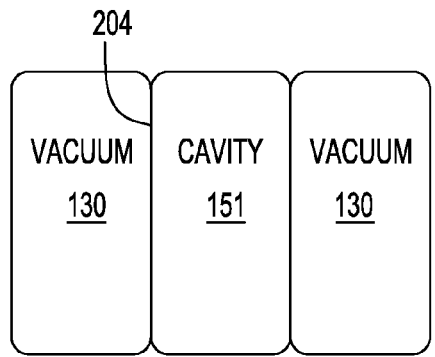
FIG. 6 is a schematic block diagram of a cavity and vacuum inlets according to the embodiment of FIG. 5

Referring to FIGS. 5 and 6, the fill head apparatus 200 includes another vacuum source 131 and another vacuum tube 134 on the opposing side of the solder reservoir 112. As shown in FIG. 6, the cavity 151 has vacuum outlets 130 on opposing sides of the cavity 151, separated by a vacuum/pressure containment wall 204. Thus, a fill head 108 is designed to realize a structure with a vacuum region on both sides of a cavity or fill region for solder (or other material) application. In this embodiment, it is possible to fill mold plates in both directions, thus improving throughput.

Using the present disclosure, a seal surface does not need to be structured or sanded, greatly improving operating window and relaxing the requirements on tight fill head down pressure and solder reservoir pressure controls. The unified compliant seal of the present disclosure is pressed into a groove in the fill head assembly and is easily replaced as the seal reaches its end of life.

Benefits of the present disclosure include increased fill speeds, for example, 3-5 times faster than typical without a leading edge vacuum. The vacuum according to the present disclosure improves both vacuum and solder seals on the mold surface since it contributes additional downward force on the seal surface. Additionally, defects were reduces due to partially filled cavities. The seal surface finish was not critical to the process in the present disclosure, since venting no longer controlled the removal rate of gas from the cavities before solder fill. Further, solder leaks were reduces, and wiping was improved, with no streaking, and the need to vent channels between the vacuum and solder regions was eliminated.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A fill head apparatus, comprising:
   at least one chamber for holding a fluid, the chamber having an outlet for expelling the fluid;
   at least one vacuum device having a vacuum inlet adjacent to the fluid outlet; and
   a flexible and resilient unified seal assembly contacting a top surface of a workpiece having defined therein at least a first cavity and a second cavity, wherein the unified seal assembly consists of a solder fill region that is above the first cavity and under the fluid outlet, a vacuum region that is above the second cavity and under the vacuum inlet, and seals with curved heads configured to contact the top surface of the workpiece, wherein the seals of the unified seal assembly create at least a first seal around the fluid outlet and the vacuum inlet such that each of the fluid outlet and the vacuum inlet are sealed off from ambient pressure, wherein the seals of the unified seal assembly create at least a second seal between the fluid outlet and the vacuum inlet such that each of the fluid outlet and the vacuum inlet are sealed off from one another.

2. The apparatus of claim 1, wherein the unified seal assembly in conjunction with the vacuum device create at least a partial vacuum in the second cavity.

3. The apparatus of claim 1, wherein the curved heads of the seals maintain contact with the top surface of the workpiece as the workpiece is moved longitudinally sliding the unified seal assembly along the top surface of the workpiece.

4. The apparatus of claim 1, wherein the chamber is pressurized.

5. The apparatus of claim 1, wherein the chamber is pressurized for expelling the fluid.

6. The apparatus of claim 4, wherein the fluid outlet is positioned after the vacuum inlet in relation to a direction of movement of the workpiece.

7. The apparatus of claim 1, wherein the fluid is solder.

8. The apparatus of claim 1, wherein the workpiece moves in a longitudinal direction substantially perpendicular to the fill head apparatus.

9. The apparatus of claim 1, wherein the unified seal assembly is comprised of a temperature resistant material.

10. The apparatus of claim 1, wherein the unified seal assembly is comprised of a polymer.

11. The apparatus of claim 1, wherein the vacuum inlet is positioned along a longitudinal axis on a side of the fluid outlet such that the workpiece moves along the longitudinal axis in a direction wherein the first cavity encounters the vacuum inlet before the fluid outlet.

12. The apparatus of claim 1, wherein the unified seal assembly is comprised of rubber.

13. The apparatus of claim 1, further comprising a plurality of vacuum devices and a plurality of vacuum inlets, each of the plurality of vacuum inlets being positioned on opposing sides of the fluid outlet such that the workpiece moves in either direction along a longitudinal axis such that the first cavity encounters one of the plurality of vacuum inlets before encountering the fluid outlet.

14. The apparatus of claim 1, wherein the workpiece is rotated about a latitudinal axis and rotated along a longitudinal plane.

15. The apparatus of claim 1, wherein the workpiece is a semiconductor wafer.

16. The apparatus of claim 1, wherein the seals include first and second non-curved linear shoulders.

* * * * *